(12) United States Patent
Wenk

(10) Patent No.: US 10,852,794 B2
(45) Date of Patent: Dec. 1, 2020

(54) METHOD FOR ACTIVATING A PROCESSING UNIT USING A CIRCUIT CONFIGURATION IN RESPONSE TO AN ACTIVATION SIGNAL

(71) Applicant: Robert Bosch GmbH, Stuttgart (DE)

(72) Inventor: Stephan Wenk, Ditzingen (DE)

(73) Assignee: Robert Bosch GmbH, Stuttgart (DE)

(*) Notice: Subject to any disclaimer, the term of this patent is extended or adjusted under 35 U.S.C. 154(b) by 88 days.

(21) Appl. No.: 16/246,609

(22) Filed: Jan. 14, 2019

(65) Prior Publication Data
US 2019/0227816 A1    Jul. 25, 2019

(30) Foreign Application Priority Data
Jan. 22, 2018   (DE) .......................... 10 2018 200 931

(51) Int. Cl.
*G06F 1/26*     (2006.01)
*G06F 1/32*     (2019.01)
*G06F 1/3206*   (2019.01)

(52) U.S. Cl.
CPC .............. *G06F 1/26* (2013.01); *G06F 1/3206* (2013.01)

(58) Field of Classification Search
CPC .................................. G06F 1/26; G06F 1/3206
See application file for complete search history.

(56) References Cited

U.S. PATENT DOCUMENTS

| | | | | |
|---|---|---|---|---|
| 5,657,238 A | * | 8/1997 | Lindeboom | G01K 7/24 |
| | | | | 702/65 |
| 8,674,661 B2 | * | 3/2014 | Yamada | H02H 7/18 |
| | | | | 320/134 |
| 9,780,660 B2 | * | 10/2017 | Hashimoto | H02M 1/32 |

* cited by examiner

*Primary Examiner* — Stefan Stoynov
(74) *Attorney, Agent, or Firm* — Norton Rose Fulbright US LLP; Gerard Messina

(57) ABSTRACT

A method for activating a processing unit using a circuit configuration in response to an activation signal, and when the activation signal exceeds a switching threshold, a reference-voltage source is connected to a supply-voltage source, the reference-voltage source supplies a first reference voltage at a first comparator and supplies a second reference voltage at a second comparator, the first comparator carries out a comparison with the first reference voltage in order to detect a high level of the activation signal, and the second comparator carries out a comparison with a second reference voltage, and if a high level of the activation signal is detected, a voltage supply is activated with a time delay at a particularly low deviation from the desired delay time, via a variation of the supply voltage and the temperature.

17 Claims, 2 Drawing Sheets

METHOD FOR ACTIVATING A PROCESSING UNIT USING A CIRCUIT CONFIGURATION IN RESPONSE TO AN ACTIVATION SIGNAL

CROSS REFERENCE

The present application claims the benefit under 35 U.S.C. § 119 of German Patent Application No. DE 102018200931.7 filed on Jan. 22, 2018, which is expressly incorporated herein by reference in its entirety.

FIELD

The present invention relates to a method for activating a processing unit using a circuit configuration in response to an activation signal, and to a circuit configuration for activating a processing unit in response to an activation signal.

BACKGROUND INFORMATION

Within the course of a wake-up request, processing units that are in a sleep mode or in a deactivated state featuring a deactivated or minimized current or voltage supply may be reactivated, i.e., awakened again. Such a processing unit may be woken up via a communications system such as Ethernet or a CAN or by way of a dedicated control signal on a line or wake-up line (hereinafter: WUL) which is not a direct part of the bus system.

Control units in motor vehicles can often be directly connected to a motor vehicle battery, which means that these control units are connected to the motor vehicle battery and drain energy therefrom even when the motor vehicle is not being operated and is parked, for example. In order to ensure that the vehicle battery will not be excessively drained by such control units during a standstill of the motor vehicle, it is therefore important to set such control units to a sleep mode that features a low energy consumption when the motor vehicle is standing still. Using a wake-up signal or an activation signal, which may be received via a WUL that is not a direct part of the bus system, these control units are able to be reactivated from their sleep mode.

SUMMARY

According to the present invention, a method for activating a processing unit with the aid of a circuit configuration in response to an activation signal is provided, and also a circuit configuration for activating a processing unit in response to an activation signal. Advantageous example embodiments are described herein. Advantages and preferred embodiments of the method according to the present invention and the circuit configuration according to the present invention similarly result from the description below.

More specifically, the activation signal is a signal, in particular a dedicated control signal, in response to which the processing unit is woken up or activated again from a deactivated state or sleep mode. For practical purposes, the activation signal may be output by an external source and be received by the circuit configuration (passive mode). In particular, the activation signal may be received by the circuit configuration via a line or WUL that is not a direct part of a bus system. Alternatively or additionally, the activation signal may also be internally generated in the circuit configuration itself (active mode) and particularly be output by the circuit configuration to further processing units via the wake-up line in order to activate them from their respective sleep modes.

For practical purposes, the circuit configuration may also be realized as part of the processing unit itself or may also be developed as an additional circuit which is connected to the processing unit.

When the activation signal exceeds a switching threshold, then a reference-voltage source is connected to a supply voltage source. This supply voltage source is particularly provided as the energy supply of the processing unit. A supply-voltage terminal is expediently connectable via a switch to the reference-voltage source, the circuit configuration being developed to close the switch in response to the receipt of an activation signal that exceeds the switching threshold and to thereby connect the reference-voltage source to the supply-voltage terminal. This switch is to be considered a high-side switch, in particular, and is expediently developed as a MOSFET or a bipolar transistor.

The reference-voltage source is developed to supply a first reference voltage at a first comparator and to supply a second reference voltage at a second comparator when it is connected to the supply-voltage source. The first comparator carries out a comparison with the first reference voltage in order to detect a high level of the activation signal. The second comparator carries out a comparison with the second reference voltage, in particular in order to represent a desired time lag on the basis of a charge curve at a capacitor.

The circuit configuration is furthermore developed to activate a voltage supply when a high level of the activation signal is detected, in particular a voltage supply of the reference-voltage source and/or the comparators. More specifically, this voltage supply is able to be directly or indirectly connected to the supply-voltage terminal. When the comparator fails to detect a high level of the activation signal, the voltage supply of the reference-voltage source, the comparators and the processing unit will expediently not be activated.

In an advantageous manner, the voltage supply is therefore activated with a time delay with a particularly small deviation from the desired delay time, via a variation of the supply voltage and the temperature. Cost-effective components, in particular, may be used while still allowing for an exact time delay, even in the presence of extreme demands in terms of the quiescent current and impedance, especially in the presence of extreme WUL-input impedance demands. As a result, a microcontroller is able to be started as quickly as possible following a minimum delay time, and maximally permitted start-up times are able to be met and not compromised.

The present method or the present circuit configuration has considerable advantages over the usual options for activating processing units. In the conventional way, two different reference-voltage sources are frequently used as well as an input voltage divider. These two reference-voltage sources and the comparator are normally unable to be supplied via the supply-voltage source in the usual manner. In most cases, a first reference-voltage source is therefore operated using the activation signal, but this entails the risk that the demand on the input impedance of the activation signal will not be met. The comparator and the second reference-voltage source are often provided with a constant supply, which is complex and expensive, however.

In contrast, in the framework of the present invention, no two different reference-voltage sources are used but advantageously only a single reference-voltage source, which supplies the comparators with two reference voltages. The reference-voltage source and furthermore at least one of the comparators are expediently supplied directly from the supply-voltage source, and especially only when the activation signal exceeds the switching threshold, which is advantageously specified by the switch or high-side switch. In an expedient manner, a constant supply of the reference-voltage source and the comparators is therefore not required. The circuit configuration is able to be realized at a low outlay in labor and material and inexpensively. For example, the reference-voltage source may be implemented in an inexpensive manner as a Zener diode. The comparator, for instance, may be implemented in a cost-effective integrated switching circuit.

Within the framework of the present invention, it is especially possible that a signal with a pulse or a pulse period of less than 10 ms does not activate the voltage supply or a corresponding voltage controller of the processing unit, which therefore means that no unintended activation of the processing unit occurs in response to such a signal. With a signal having a pulse duration of more than 10 ms, on the other hand, the voltage supply or the voltage controller are expediently activated. Since it may particularly be specified that a signal or an activation signal having a pulse duration of more than 20 ms is to lead to an activation of the processing unit, it should be ensured through suitable circuitry that a reliable distinction can be made between pulse lengths of up to 10 ms and of more than 20 ms. The processing unit is expediently started up in response to such an activation signal, so that it is able to keep the voltage supply or the voltage controller in the activated state on its own.

When a high level of the activation signal is detected, the voltage supply of the processing unit is activated, preferably following a time delay of a predefined time interval of 10 ms, for instance. A capacitor, in particular, is used for this purpose. After the comparison threshold of the first comparator has been reached, the current from the reference-voltage source is expediently enabled in this capacitor via a current restriction, preferably a resistor, for the time delay. This is particularly accomplished by terminating a short-circuit of the capacitor through the first comparator.

The first comparator is preferably developed to carry out a comparison of the activation signal and the first reference voltage, so that a high level of the activation signal is able to be detected. In particular, the first comparator is developed to reliably distinguish between a high level of the activation signal, the lowest voltage that is meant to lead to the activation of the processing unit, and a low level, the highest voltage that is not meant to lead to an activation. The switching threshold of the switch for activating the reference-voltage source and the comparators is particularly selected such that it is safely reached before the activation line reaches the voltage of the first reference voltage to be activated.

The second comparator is preferably developed to carry out a comparison of a charging voltage of a charge current from the reference-voltage source, enabled by the first comparator, at a capacitor and the second reference voltage in order to achieve a desired time delay. More specifically, the comparator is developed to generate a matching output signal for the further processing once a specific voltage has been reached at the capacitor.

In an advantageous manner, one of the two reference voltages supplied by the reference-voltage source is read in by the processing unit, in particular when the high level of the activation signal is detected. The reference-voltage source is preferably connected to a terminal of the processing unit for this purpose. It is therefore specifically ensured that the processing unit is able to read in a state of the activation signal also without a time delay. In the conventional manner, such a read-in operation often requires signal conditioning and signal protection, such as with the aid of an additional transistor. In contrast, the processing unit is able to directly read in the corresponding reference voltage, and signal conditioning and signal protection are specifically not required, which means that a corresponding transistor is able to be saved.

According to one preferred embodiment, the reference-voltage source provides the first reference voltage and derives a second reference voltage from the first reference voltage via a voltage divider, e.g., at a 1:1 ratio, using a resistance voltage divider, for instance. Purely by way of example, it may have 27 kOhm to 27 kOhm. Tolerances in the first reference voltage in particular do not lead to a significantly inaccurate time delay. Due to the selection of a voltage divider which deviates from the 1:1 ratio, it is particularly possible to select the delay of the startup of the processing unit by the predefined time interval independently of the capacitor used for the time delay.

When a detected high level of the activation signal is detected and especially following an occurred signal delay of ideally 10 ms, a pulse expansion of the activation signal is preferably implemented. A pulse-expansion device, in particular, is provided in the circuit configuration for this purpose, which advantageously includes a diode and a capacitor. In an expedient manner, the pulse duration of the activation signal may thus be sufficiently expanded with the aid of the pulse-expansion device. In particular, the processing unit may be started in response to such an expanded activation signal, so that it is able to keep the voltage supply or the voltage controller activated on its own. The pulse-expansion device expands the pulse at least as long as the processing unit is able to keep the voltage supply activated.

In an advantageous manner, one of the two reference voltages supplied by the reference-voltage source is made available to the pulse-expansion device for the pulse expansion of the activation signal. Toward this end, the reference-voltage source is preferably suitably connected to the pulse-expansion device. In an expedient manner, the reference voltage is therefore used not only for the comparator but preferably used again for generating the pulse expansion.

The reference-voltage source is connected to the pulse-expansion device, preferably via a resistor or pull-up resistor. Thus, a controlled input voltage is expediently provided for the pulse-expansion device, which means that it may have a simple construction, preferably using a diode and a capacitor. Despite the simple construction and especially despite fluctuations in parameters such as the temperature and operating voltage, the controlled input voltage for the pulse-expansion device allows for an approximately constant pulse-expansion time.

The first comparator may advantageously be developed as a MOSFET or as a bipolar transistor or as a combination of transistors, in particular as a combination of MOSFETs and/or bipolar transistors, especially in order to distinguish between a maximum value ("high level") and a minimum value ("low level") of the activation signal. In particular the expediently low demands on the switching threshold in terms of accuracy allow for such a simple development of the first comparator.

According to one preferred further development, the activation signal is received via an interface such as a bidirectional single-wire interface. This interface is especially not a direct part of a communications system such as CAN, Ethernet, etc. More specifically, the circuit configuration is connected to a WUL via this interface.

Alternatively or additionally, the activation signal may be generated in the circuit configuration using a control element and then be transmitted via the interface and the WUL to a processing unit or to a plurality of further processing units, which are activated according to the above explanations by their respective circuit configurations upon the receipt of this activation signal.

In an advantageous manner, an EMC filter (electromagnetic compatibility) is provided, which is expediently connected to the interface and/or the control element. With the aid of this EMC filter, a signal that is received via the interface or a signal received from the control element is expediently able to be filtered before it is forwarded to elements of the circuit configuration. For practical purposes, the EMC filter is connected to the switch or high-side switch and furthermore especially to the comparator.

In an especially advantageous manner, the present invention is suitable for use in motor vehicles. The processing unit is preferably a control unit of a motor vehicle or a microcontroller of such a control unit, and the supply-voltage source is preferably a vehicle battery. The circuit configuration may especially be realized as part of the control unit and, for example, be switched between the microcontroller and a voltage supply of the control unit on the one hand, and the vehicle battery on the other. For example, the control unit may be permanently connected to the vehicle battery via a KL30 terminal connection of the motor vehicle. In a parked, deactivated state of the motor vehicle, the control unit may be set to a sleep mode and be woken up or activated again with the aid of the circuit configuration in response to a wake-up signal. In this case, the communications system is preferably a bus system of the motor vehicle to which further control units are expediently connected and which is developed as an Ethernet system, for example. In addition to this bus system, the WUL is preferably provided to transmit the activation signal.

Additional advantages and embodiments of the present invention are described below and are shown in the figures.

The present invention is schematically illustrated in the figures with the aid of exemplary embodiments and is described below with reference to the figures.

DETAILED DESCRIPTION OF EXAMPLE EMBODIMENTS

Figure 1:
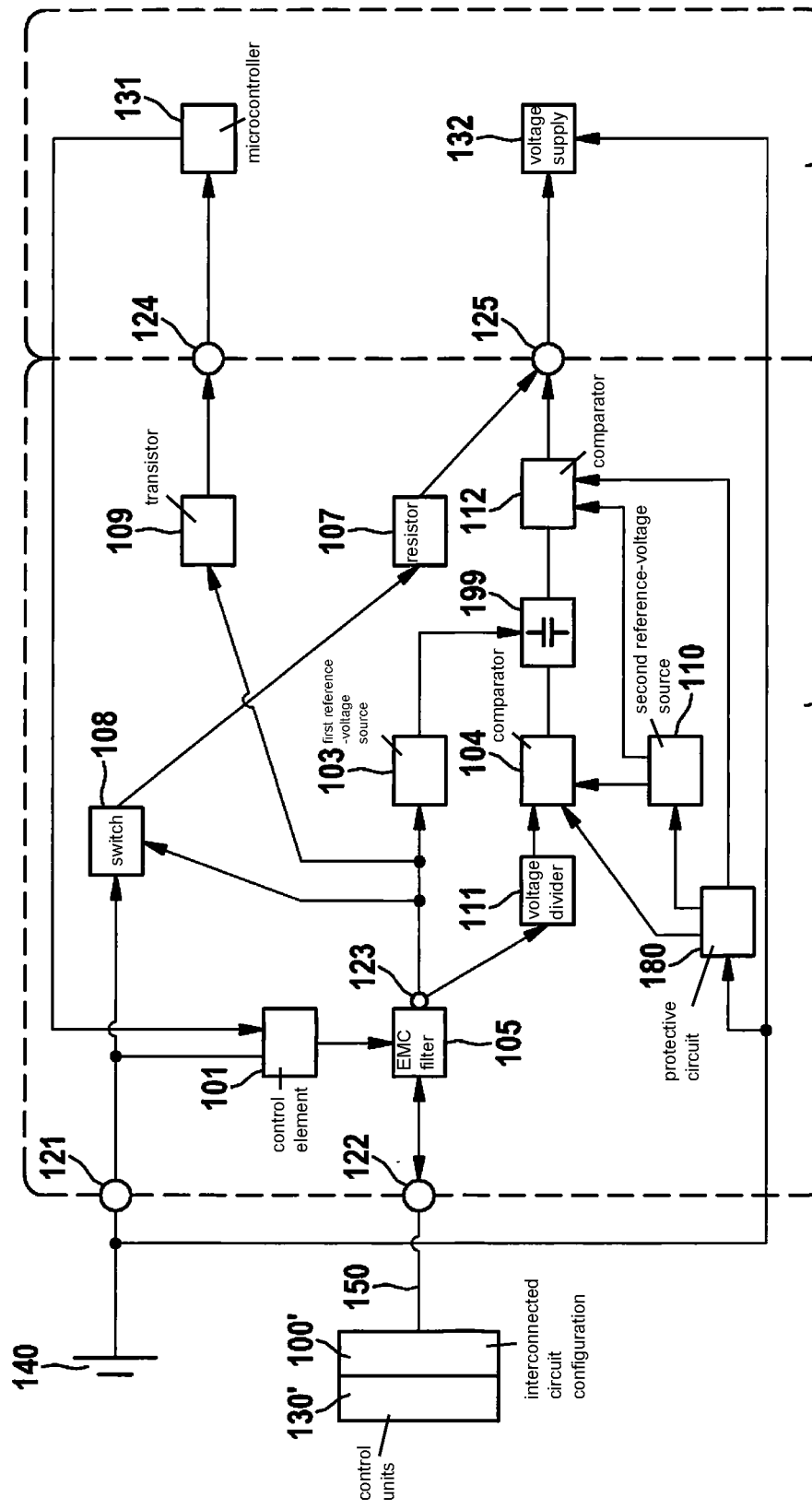
FIG. 1 schematically shows a circuit configuration for activating a processing unit, which is not developed according to the present invention.

FIG. 1 schematically shows a circuit configuration 100 for the activation of a processing unit, which is not developed according to the present invention. Processing unit 130 is developed as a control unit of a motor vehicle, for example, and has a microcontroller 131 as well as a voltage supply 132. Control unit 130 is permanently connected to a supply-voltage source 140 such as a vehicle battery.

Using circuit configuration 100, voltage supply 132 of control unit 130 is able to be activated and deactivated so that a very low quiescent current of particularly less than 100 µA is withdrawn until the activation. Circuit configuration 100 may be realized as part of control unit 130.

Using an activation signal or wake-up signal, which may be received via a communications system 150 of the motor vehicle, in particular a WUL 150 that is not directly part of a bus system, control unit 130 is able to be reactivated from the sleep mode and utilize supply-voltage source 140 again in order to supply the internal voltages.

Toward this end, circuit configuration 100 has a supply-voltage terminal 121, e.g., a KL30 terminal, via which circuit configuration 100 is connected to supply-voltage source 140. By way of an interface 122, e.g., a bidirectional one-wire interface, circuit configuration 100 is connected to communications system 150.

An EMC filter 105, to which a control element 101 may furthermore be connected, is connected to interface 122. If no wake-up of other control units is intended, then control element 101 may also be omitted.

A voltage divider 111 is connected to a terminal 123 of the EMC filter. Voltage divider 111 is connected to a comparator 104 to which a second reference-voltage source 110 is connected as well. Comparator 104 is developed as a dual comparator 104, 112, which is able to carry out two comparisons. Reference-voltage source 110 is particularly integrated into comparator 104, 112.

A first reference-voltage source 103 is used to charge a capacitor 199 for representing a required delay of 10 ms, for instance. Comparator 104 prevents the charging of comparator 199 for as long as communications system 150 displays a low level.

Comparator 112 compares the voltage at capacitor 199 to reference voltage 110 and controls its output 125 starting at the point of equality between the voltage at capacitor 199 and reference voltage 110.

Via a control output 125 of circuit configuration 100, comparator 112 is connected to voltage supply 132 of control unit 130.

In addition, terminal 123 is connected to a transistor 109, which is connected to microcontroller 131 via a microcontroller terminal 124 of circuit configuration 100.

A switch 108, in particular a high-side switch, is connected to terminal 123. This high-side switch 108 is furthermore connected to a resistor 107, which is connected via voltage-supply terminal 125 of circuit configuration 100 to voltage supply 132.

Resistor 107 limits the current at control output 125. The supply voltage at supply-voltage terminal 121 decisively determines the voltage at control output 125. As a result, the input of voltage supply 132 must be protected across the entire supply-voltage range at supply-voltage terminal 121.

To activate control unit 130, EMC filter 105 operates reference voltage source 103 directly through the activation signal or wake-up signal. Reference-voltage source 103 charges capacitor 199 as soon as the activation signal has a valid activation threshold (high level) at comparator 104. This threshold is defined via voltage divider 111 and second reference-voltage source 110. When the voltage at the capacitor is exceeded with respect to the reference voltage of reference-voltage source 110, comparator 112 activates voltage supply 132 of control unit 130 using resistor 107. In the process, resistor 107 is switched via high-side switch 108.

It is possible that still further control units 130' are connected via WUL 150, in particular with interconnected circuit configuration 100', which may especially be developed similarly to control unit 130 or circuit configuration 100. For example, circuit configuration 100 is able to generate an activation signal in order to activate another control unit 130', in particular with an interconnected circuit configuration 100'. For example, control element 101 is able to actively generate a corresponding activation signal or wake-up signal for this purpose (active mode) and transmit it via WUL 150 to further control units 130' or to their circuit configurations 100'. This control signal has a similar effect at terminal 123 as in 100' and 130'. Control element 101 may have a suitable control including a current limitation, e.g., a high-side switch featuring current limiting.

A circuit configuration 100 of this type thus requires an additional transistor 109 in order to read in the activation signal to microcontroller 131 for signal conditioning and signal protection. Toward this end, transistor 109 has a temperature-dependent switching threshold.

In such circuit configurations 100, dual comparator 104 and 112 and reference-voltage source 110 are frequently developed and implemented in an integrated switching circuit such that they are unable to be operated directly at supply-source terminal 121, i.e., at the KL30 terminal. Therefore, dual comparator 104 and reference-voltage source 110 are usually supplied by a constant supply, which is restricted to 16V, for example, by a protective circuit 180; however, this is expensive and complex and also causes an unnecessary increase in the current requirement of the device in the sleep mode.

In addition, in such circuit configurations 100 there is also the risk that a requested input impedance of the WUL of 10 kΩ, for instance, is not met at interface 122 when reference-voltage source 103 is supplied directly from communications system 150 via EMC filter 105. In addition, the PMOS transistor used in control element 101 is relatively expensive and requires additional protection from an overvoltage at its gate terminal because the operating voltage is too high for a typical gate.

Figure 2:
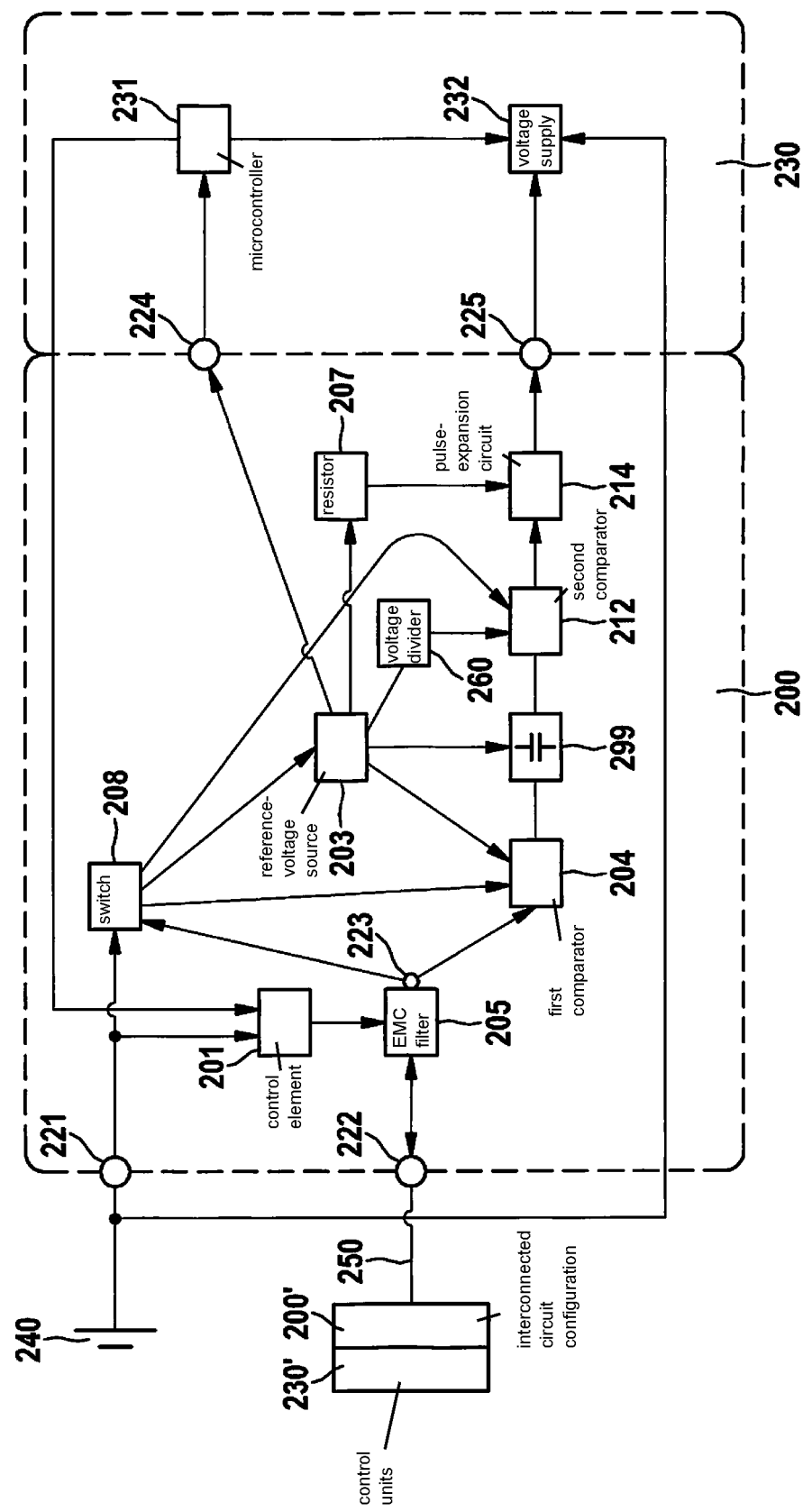
FIG. 2 schematically shows a preferred embodiment of a circuit configuration according to the present invention for activating a processing unit, which is developed to execute a preferred embodiment of the method according to the present invention.

In contrast to such circuit configurations 100, one preferred further development of a circuit configuration according to the present invention is schematically shown in FIG. 2 and denoted by 200.

Circuit configuration 200 is provided for the activation of a processing unit 230, which is advantageously developed as a control unit of a motor vehicle and has a microcontroller 231 and also a voltage supply 232. Similar to the above comments, voltage supply 232 is able to be activated with the aid of circuit configuration 200 in control unit 230.

Using an activation signal, which is able to be received via a communications system 250 of the motor vehicle, in particular a WUL that is not directly part of a bus system, control unit 230 may be activated from the sleep mode with the aid of circuit configuration 200.

For this purpose, circuit configuration 200 has a supply-voltage terminal 221, such as a KL30 terminal, via which circuit configuration 200 is connected to supply-voltage source 240. By way of an interface 222, e.g., a bidirectional one-wire interface, circuit configuration 200 is connected to communications system 250, in particular to WUL 250. An EMC filter 205 to which control element 201 is connected as well, is connected to interface 222.

In contrast to the circuit configurations according to FIG. 1, circuit configuration 200 has no two independent reference-voltage sources 103, 110. Instead, circuit configuration 200 has a single reference-voltage source 203, which is able to be connected via a switch (typically developed as a high-side switch) 208 to supply-voltage terminal 221 and thus to supply-voltage source 240. This switch 208 is developed as a bipolar transistor, for instance.

For practical purposes, a further reference voltage is derived from this reference-voltage source 203, in particular through a resistance voltage divider 260, using a 1:1 ratio, for instance. Reference-voltage source 203 is connected to a first comparator 204 and supplies a comparison value for this comparator 204. In addition, reference-voltage source 203 is connected to a second comparator 212 and is able to supply this second comparator 212 with a second reference voltage.

First comparator 204 is developed to carry out a comparison with the first reference voltage in order to detect a high level of the activation signal. Second comparator 212 is developed to carry out a comparison with the second reference voltage in order to implement the required power-on delay.

In the same way, reference-voltage source 203 is connected to a charging capacitor 299 and thus is used for supplying a charge current as soon as comparator 204 permits it. Reference-voltage source 203 is similarly connected to second comparator 212 via voltage divider 260. In this context, the output of voltage divider 260 serves as a comparison value for the comparison with the voltage of capacitor 299. The output of comparator 212 is used for the control of a pulse-expansion circuit 214. Comparators 204 and 212 may be developed as dual comparators.

In addition, EMC filter 205 is also connected to comparator 204 and switch 208. Switch 208 is especially used for the switched supply of comparators 204, 212 as well as reference-voltage source 203. As a result, reference-voltage source 203 is supplied via switch 208 from supply-voltage source 240 and—in contrast to reference-voltage source 103 of circuit configuration 100 shown in FIG. 1—does not lead to loading of WUL 250.

Reference-voltage source 203 is directly connected to a microcontroller terminal 224 and thus to microcontroller 231, without an additional interconnected transistor 109.

In contrast to circuit configuration 100, it is not high-side switch 108 but reference-voltage source 203 that is connected to a resistor 207. This ensures an excellent repeat accuracy in pulse-expansion circuit 214.

This resistor 207 as well as comparator 212 is preferably connected to a pulse-expansion device 214, which in turn is connected via a voltage-supply activation terminal 225 to voltage supply 232 of control unit 230.

With the aid of this pulse-expansion device 214, it is advantageously possible to expand a pulse or a pulse duration of the activation signal, e.g. to more than 50 ms. With the aid of such an expanded pulse of the activation signal, it may especially be achieved that microcontroller 231 is able to start and keep voltage supply 232 or a voltage controller activated itself.

Dual comparator 204 and 212 and reference-voltage sources 203 are expediently supplied only if an activation signal that exceeds a switching threshold of switch 208 is conducted to switch 208 from terminal 223 of EMC filter 205. For practical purposes, the switching threshold of the high-side switch lies between the high level, the lowest voltage that is meant to lead to the activation of the processing unit, and the low level, the highest voltage that is not meant to lead to an activation. Because of the use of only one reference-voltage source 203, from which a further reference voltage is derived at the 1:1 ratio, for instance, tolerances in the first of these two reference voltages may advantageously not lead to a significantly imprecise time delay. This first reference voltage is especially used directly in comparator 204 in order to distinguish between the high level and the low level of the activation signal. A cost-effective standard comparator may particularly be used as dual comparator 204 and 212 in this case. When a high level of the activation signal is detected, voltage supply 232 and microcontroller 231 are expediently activated following a delay of a predefined time interval of 10 ms, for example.

As an alternative, comparator 204 may also be replaced with a MOSFET or a bipolar transistor or by a combination thereof in order to distinguish between a maximum value ("high level") and a minimum value ("low level") of the activation signal and to terminate the short-circuit of the capacitor only when a "high level" is detected at interface 222.

In particular when a high level is detected, the first reference voltage of reference-voltage source 203 is used for the supply of resistor 207 and expediently supplies a controlled input voltage to pulse-expansion device 214 so that it need not become unnecessarily more expensive for a precise expansion of the pulse. Pulse-expansion device 214 may therefore be realized in a cost-effective manner and at a low outlay, e.g. using a diode and a capacitor.

In addition, the first reference voltage of reference-voltage source 203 is directly read in to microcontroller 231 via microcontroller terminal 224, and no further signal conditioning and no signal protection, in particular, are required.

More specifically, there is no risk that a required input impedance at interface 122 of 10 kΩ, for example, is unable to be met because the supply of reference-voltage source 203 is carried out via switch 208 from supply-voltage terminal 221.

In contrast to circuit configuration 100 as shown in FIG. 1, in circuit configurations 200 within the framework of the present invention, it is not two different, differently drifting reference-voltage sources 103, 110 that are used, but rather a further reference voltage derived in voltage divider 260 from a reference-voltage source 203. In the process, the same voltage reference is particularly used both for charging a timer and for generating a comparison value; as a result, tolerances of reference voltage 203 largely cancel each other out. In addition, this voltage reference is also reused for generating the pulse expansion.

Comparators 204 and 212 and reference-voltage source 203 may be operated via switch 208 directly at supply-source terminal 221, and thus directly at the KL30 terminal. No expensive and complex constant supply is required. Comparators 204 and 212 are able to be implemented in cost-effective integrated switching circuits.

Reference-voltage source 203, for instance, may be implemented as a Zener diode in a cost-effective manner.

Similarly to the above comments, it is possible that still further control units 230' are connected to communications system 250 or WUL 250, in particular with an interconnected circuit configuration 200', which may especially be developed analogously to control unit 230 or circuit configuration 200. To activate an external control unit 230', for instance, an activation signal may be actively generated by control element 201 (active mode) and then transmitted via WUL 250 to further control units 230' or their circuit configurations 200'.

What is claimed is:

1. A method for activating a processing unit with the aid of a circuit configuration in response to an activation signal, the method comprising:
   when the activation signal exceeds a switching threshold, connecting a reference-voltage source to a supply-voltage source, the reference voltage source supplying a first reference voltage at a first comparator and a second reference voltage at a second comparator;
   carrying out, by the first comparator, a comparison with the first reference voltage to detect a high level of the activation signal;
   carrying out, by the second comparator, a comparison with the second reference voltage; and
   activating a voltage supply when the high level of the activation signal is detected.

2. The method as recited in claim 1, wherein when a high level of the activation signal is detected, the voltage supply is activated following a time delay having a predefined time interval.

3. The method as recited in claim 1, wherein the second comparator carries out a comparison of a charging voltage of a charge current from the reference-voltage source at a capacitor, enabled by the first comparator, and the second reference voltage.

4. The method as recited in claim 1, wherein the first reference voltage supplied by the reference-voltage source is read in by the processing unit.

5. The method as recited in claim 1, wherein the reference-voltage source supplies the first reference voltage and derives the second reference voltage from the first reference voltage via a voltage divider.

6. The method as recited in claim 1, wherein when the high level of the activation signal is detected, a pulse expansion of the activation signal is implemented with the aid of a diode and a capacitor.

7. The method as recited in claim 6, wherein one of the first reference voltage supplied by the reference-voltage source or the second reference voltage supplied by the reference-voltage source is provided to a pulse-expansion device for a pulse expansion of the activation signal.

8. The method as recited in claim 7, wherein the reference-voltage source is connected to the pulse-expansion device via a resistor.

9. A circuit for activating a processing unit in response to an activation signal, wherein a supply-voltage terminal is able to be connected via a switch to a reference-voltage source, wherein:
   the circuit is configured to close the switch in response to receipt of an activation signal that exceeds a switching threshold to connect the reference-voltage source to the supply-voltage terminal,
   wherein the reference-voltage source is configured to supply a first reference voltage at the first comparator in a state when a connection to the supply-voltage terminal exists, and to supply a second reference voltage at the second comparator,
   the first comparator is configured to carry out a comparison with the first reference voltage to detect a high level of the activation signal, and
   the second comparator is configured to carry out a comparison with the second reference voltage and to activate a voltage supply when a high level of the activation signal is detected.

10. The circuit as recited in claim 9, which is furthermore configured to activate the voltage supply following a time delay by a predefined time interval when a high level of the activation signal is detected.

11. The circuit as recited in claim 9, wherein the second comparator is configured to carry out a comparison of a charging voltage of a charge current, enabled by the first comparator, from the reference-voltage source to a capacitor, and the first reference voltage.

12. The circuit as recited in claim 9, wherein the reference-voltage source is connected to a terminal of the processing unit in such a way that the first reference voltage supplied by the reference-voltage source is able to be read in by the processing unit.

13. The circuit as recited in claim 9, wherein the reference-voltage source is configured to supply the first reference voltage and to derive the second reference voltage from the first reference voltage via a voltage divider.

14. The circuit as recited in claim 9, further comprising:
a pulse-expansion device configured for a pulse expansion of the activation signal and includes a diode and a capacitor.

15. The circuit as recited in claim 14, wherein the reference-voltage source is connected to the pulse-expansion device in such a way that one of the first reference voltage supplied by the reference-voltage source supplied by the reference-voltage source or the second reference voltage supplied by the reference-voltage source is able to be made available to the pulse-expansion device.

16. The circuit as recited in claim 14, wherein the reference-voltage source is connected to the pulse-expansion device via a resistor.

17. The circuit as recited in claim 9, wherein the first comparator is a MOSFET or a bipolar transistor or a combination of transistors.

* * * * *